Oct. 31, 1967  J. BAER  3,349,880
MAGNETIC SPRING CLUTCH ASSEMBLY
Original Filed Aug. 14, 1964
2 Sheets-Sheet 1
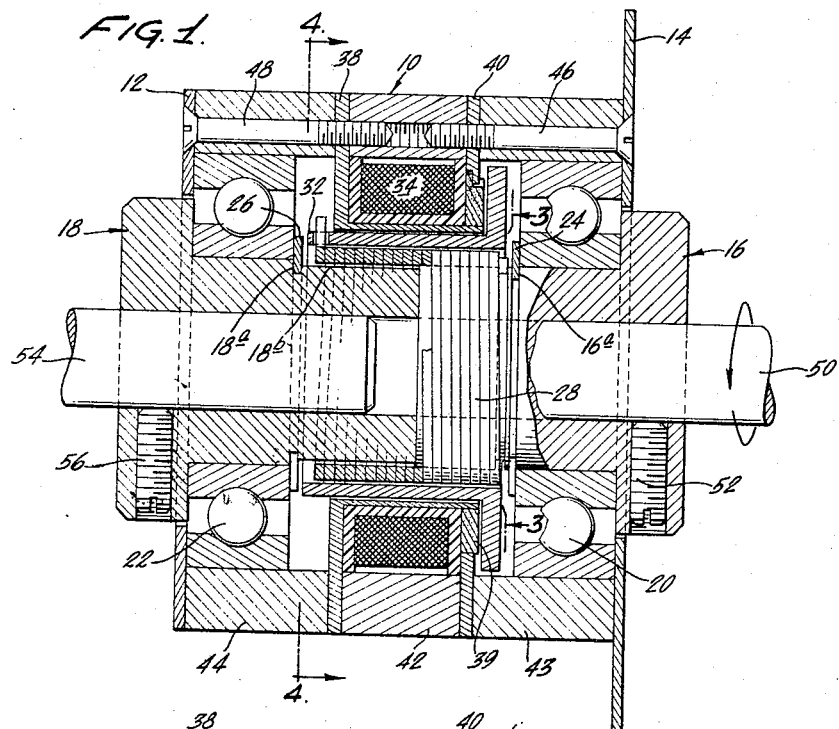
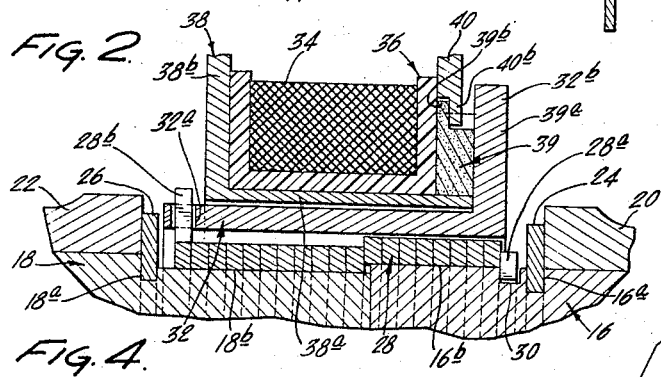
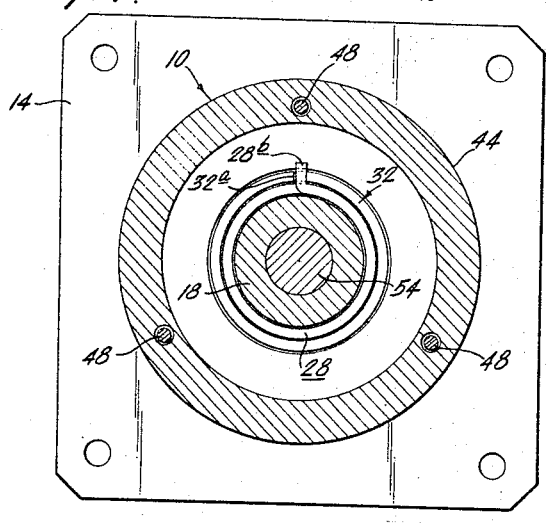
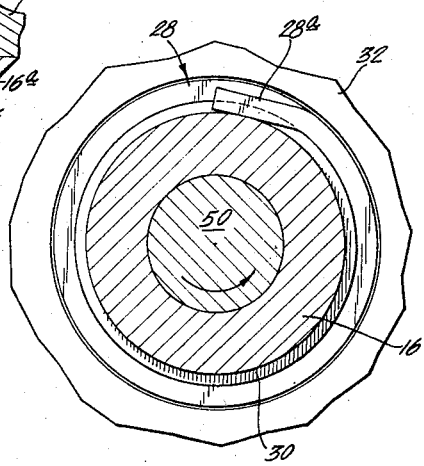
Inventor:
John Baer
by Howson & Howson
Attys.

Oct. 31, 1967  J. BAER  3,349,880
MAGNETIC SPRING CLUTCH ASSEMBLY
Original Filed Aug. 14, 1964  2 Sheets-Sheet 2
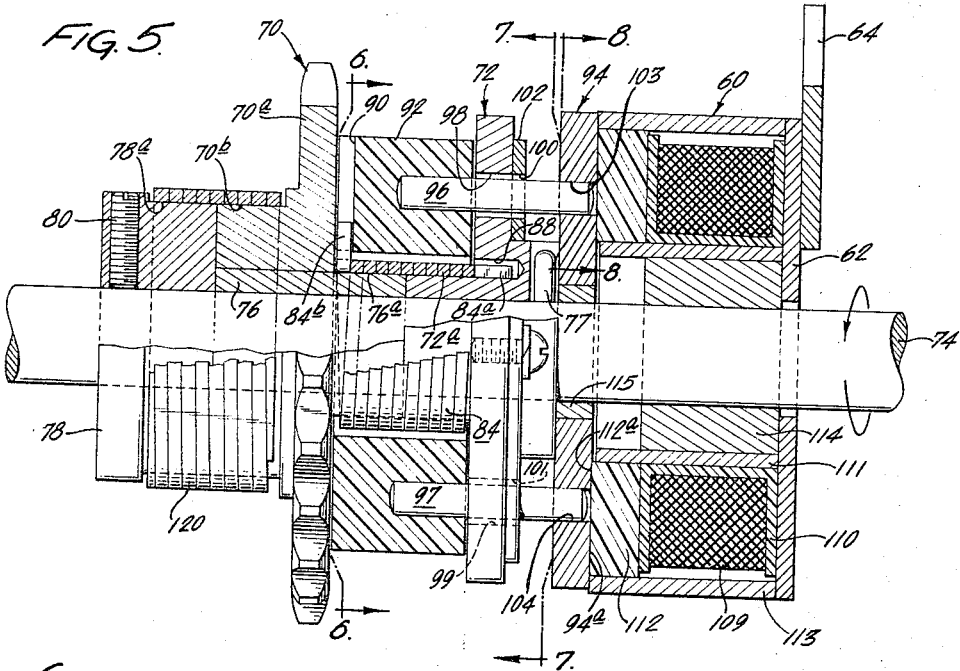
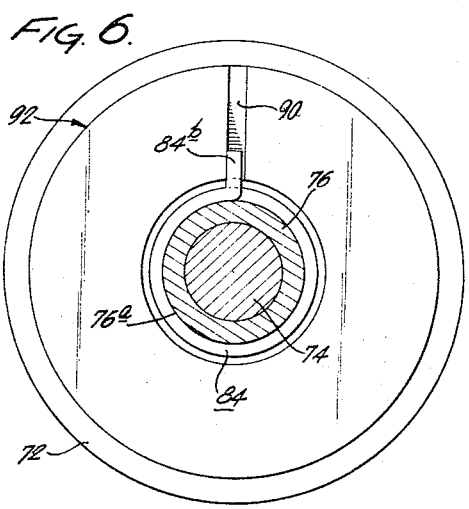
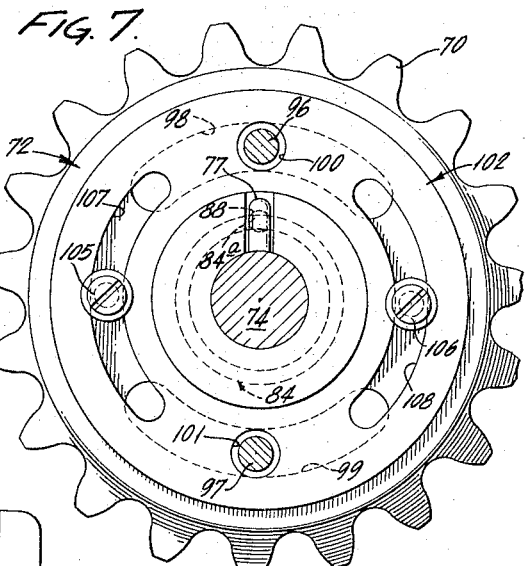
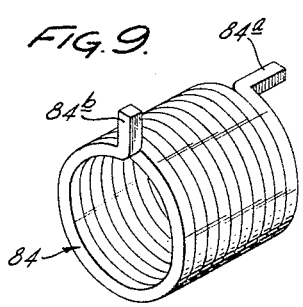
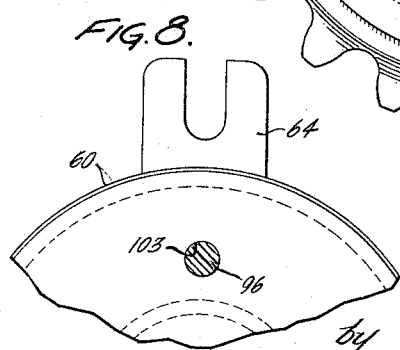
Inventor:
John Baer
by Howson & Howson
Attys.

United States Patent Office 3,349,880
Patented Oct. 31, 1967

3,349,880
MAGNETIC SPRING CLUTCH ASSEMBLY
John Baer, Medford Lakes, N.J., assignor to Precision Specialties, Inc., Pitman, N.J., a corporation of Missouri
Continuation of application Ser. No. 389,741, Aug. 14, 1964. This application June 15, 1966, Ser. No. 557,842
12 Claims. (Cl. 192—84)

This is a continuation of application Ser. No. 389,741, filed Aug. 14, 1964, now abandoned.

The present invention relates to a clutch assembly; and more specifically, to a spring clutch assembly having improvements in the means for actuating the clutch spring into and out of driving relation with a driven member.

The present invention belongs to that class of clutches which provides aligned input and output hubs with a helical spring surrounding a cylindrical face of at least one of the hubs, and preferably both hubs, and having one end affixed to one of the hubs. The other end of the spring is attached to a collar or sleeve member, which preferably surrounds the spring. If the spring is of the wrap-down type, it is wound in a direction such that a drag imposed on the collar will cause the spring to coil more tightly to engage the cylindrical surface of the hub to which the spring is not attached so that the two hubs then rotate together. On the other hand, if the spring is of the unwrap type, it is wound to loosen when a drag is imposed on the collar so that the spring will disengage the cylindrical surface of the hub to which it is not attached, thereby the freed hub will no longer be rotatably driven relative to the other hub. When the drag is removed from the collar, the springs in both of the abovementioned types return to their original conditions whether that involves release or wrap-down on the unattached hub.

In the prior art, the only available magnetically actuated spring clutches of either of the helical spring types have provided a solenoid or similar device to cause a brake shoe to bear against the collar fixed to one end of the helical spring for actuating the spring into or out of driving relation with a driven hub in conventional fashion. The solenoid-plunger arrangement of the prior art has extended outwardly from the collar and thereby provided a rather awkward unsymmetrical assembly which tends to be rather bulky. The bulk and awkward shape has in turn precluded use of the clutch in certain applications where space is at a premium.

The present invention involves a spring clutch assembly which is very compact, small, light in weight and yet effective to transfer large amounts of torque. It is capable of use in places where prior art devices could not be used.

In accordance with the present invention, the driving and driven hubs are rotatable along an axis through a frame which may be a housing containing the clutch assembly. The helical spring is fixed at one end to one of the hubs and encircles the cylindrical surface of the other hub. The free end of the helical spring is held by a rotatable means which need not surround the spring but usually takes the form of a surrounding collar. The helical spring has a wrap-down condition and an unwrap condition in relation to the hub which the spring encircles. When the spring is in its wrap-down condition, the driving hub will drive the driven hub; and conversely when the spring is in its unwrap condition, the driving hub rotates free of the driven hub. A brake member supported by the frame is positioned to provide a braking surface against which the rotatable means is drawn to retard its rotational movement, thereby actuating the clutch spring between its two conditions. The movement of the rotatable means against the brake member is accomplished by a means on the frame for producing a magnetic field to draw the rotatable means into engagement with the braking surface of the brake member, thereby retarding the rotational movement of the rotatable means. The means for producing a magnetic field is preferably electrically energized.

In a preferred embodiment a field winding supported by the frame produces a magnetic field, and a magnetic core for this winding is part of a magnetic circuit supported by the frame. Part of the rotatable means provides an armature across a gap in the magnetic circuit. When the field winding is energized, current flowing in the field winding produces a flux in the magnetic circuit which provides a magnetic force at the gap which draws the portion of the rotatable means providing the armature toward the gap and thereby moves the rotatable means against the brake member, in turn, retarding the rotational movement of the rotatable means. In this manner the helical spring is actuated between its two conditions. Since a portion of the rotatable means serves as an armature across the gap in the magnetic circuit and the magnetic circuit itself can be compact, a more compact and efficient spring clutch assembly is realized than any spring clutch assembly in the prior art.

For a better understanding of the present invention, reference is made to the following drawings wherein:

FIG. 1 is an elevational view partially in section of one embodiment of the clutch assembly in accordance with the present invention;

FIG. 2 is an enlarged fragmentary sectional view of a portion of FIG. 1;

FIG. 3 is a sectional view taken along the line 3—3 of FIG. 1;

FIG. 4 is a sectional view taken along the line 4—4 of FIG. 1;

FIG. 5 is an enlarged sectional view of a clutch assembly embodying another form of the present invention;

FIG. 6 is a sectional view taken along line 6—6 of FIG. 5;

FIG. 7 is a sectional view taken along the line 7—7 of FIG. 5;

FIG. 8 is a fragmentary sectional view taken along line 8—8 of FIG. 5; and

FIG. 9 is a perspective view of the helical clutch spring contained in the embodiment of the invention shown in FIG. 5.

Referring to FIG. 1 a preferred embodiment of the clutch of the present invention is shown in a sectional view which illustrates that the supporting frame consists of a compound tubular housing 10 and end plates 12 and 14. As seen in FIG. 4, end plate 14 serves also as a mounting bracket where required in that it extends beyond the outer diameter of tubular housing 10.

The main rotational elements of a clutch are input hub 16 and output hub 18 which are rotatably supported along a common axis relative to the housing by frictionless bearings 20 and 22, which are preferably ball bearings. The outer races of bearings 20 and 22 are held in place within tubular housing 10 by end plates 12 and 14, whereas the inner race portions of the bearing are retained on the hubs by snap rings 24 and 26, which hold the inner races against the shoulders 16a and 18a, respectively, providing a discontinuity between the smaller diameter portions of the hubs on which the bearings are supported and the larger diameter portions which effectively close the circular openings in the end plates. The smaller diameter portions of the subs 16 and 18 project inwardly toward one another and, by their abutment, tend to keep the hub and bearing assembled in proper axial position. The cylindrical surfaces of these hubs provide the clutch faces which cooperate with a closely wound helical clutch spring 28 which is square in section. Clutch spring 28 may snugly fit over clutch face 16b of the input hub but preferably clears the clutch face 18b when the spring is in relaxed condition. For this purpose, clutch face 18b may be slightly reduced in diameter over the diameter of clutch face 18a. As seen in FIG. 3, spring 28 has a portion of its first turn 28a bent so as to engage in circumferential groove 30 on input hub 16 provided for that purpose. Groove 30 secures turn 28a against displacement of the spring 28 along the axis of the hub. The other end 28b of spring 28 is preferably bent to form a tang which extends radially outwardly and rides in a hole 32a drilled in tubular collar 32 which preferably surrounds the helical spring 28. Collar 32 is provided with a radially outwardly extending flange 32b having a flat brake face and composed of magnetic material.

The purpose of making at least flange 32b of magnetic material is to provide an armature for a magnetic circuit. The flux for this magnetic circuit is provided by a field winding 34 which is wound on a bobbin 36 of nylon which, as best seen in FIG. 2, fits snugly over a tubular portion 38a and against the radial portion 38b of member 38 composed of magnetic material. An annular brake member 39 of non-magnetic material fits snugly over portion 38a and against bobbin 36. Brake member 39 provides a braking surface 39a which is flush with the end of member 38a to provide a braking surface against which flange 32b may be pulled for braking, as will be described hereafter. Against the opposite sidewall of the bobbin 36 from member 38b is another annular radially extending member 40 of magnetic material. The brake member 39 and annular member 40 have mating projections 39b and 40b on the outer and inner diameter of the members, respectively, formed by swaging a portion of the members to provide sockets and projections to interlock the members, thereby holding the brake member 39 fixed in position. As seen in FIG. 1, a magnetic circuit is completed by tubular member 42 of magnetic material which serves as part of the housing 10. Tubular members 43 and 44 cooperate with member 42 and members 38 and 40 to complete the housing, and they are held together in assembly by the same screws 46 and 48 which secure the end plates 14 and 12, respectively.

In operation, by way of example, power is fed through the input hub through shaft 50 which is connected to the input hub in conventional manner as by use of a set screw 52 or suitable keying means. The rotation of shaft 50 produces rotation of the hub 16 relative to the housing and this, in turn, causes helical spring which is affixed to the hub 16 to rotate with it. Since the spring is, in turn, fixed to the collar 32, the collar rotates in synchronism with spring 28, hub 16 and shaft 12. Since the hub 18 has a clearance at hub face 18b, it will not be driven by the clutch spring when the field winding 34 is not energized. However, when winding 34 is energized by a suitable D.C. source so that a magnetic field is created within the magnetic circuit defined by members 38, 40 and 42, flange 32b of collar 32 provides the path of the lowest reluctance across the air gap of that circuit and, like an armature across any magnetic air gap, flange 32b is drawn toward that gap in order to reduce to a minimum the total length of the air path through which the magnetic flux must pass. In the process, the flange 32b and hence the collar 32 are pulled laterally from the position shown in FIG. 1 to the position shown in FIG. 2 and the pull causes the face of flange 32b to abut the braking surface 39a of brake member 39, as shown in FIG. 2. Because of the pull on the flange 32b, braking surface 39a offers resistance to rotation due to frictional effect, and slows down the collar 32 relative to hub 16. The spring 28, which is attached at its ends to these respective members, yields; and, because the spring is wound in such a direction that a slowing of the collar relative to the hub 16 will cause a decrease spring diameter, the portion of the spring surrounding clutch face 18b of hub 18 tightens down against that face as shown in FIG. 2. Thereafter hub 18 will be driven in synchronism with hub 16, with the collar 32 and flange 32a slipping with respect to the braking surface 39a until the magnetic flux is eliminated by deenergization of the winding. At that time the collar is again free to rotate at the same rate as the hub and the spring 28, and due to the springs inherent resilience, it returns to the position of FIG. 1 so that it no longer drives hub 18. Hub 18, like hub 16, may be coupled to its selected load by an output shaft 54 held in place within the hub by screw 56, as shown, or by any other suitable keying means.

It will be observed that by having both the collar and brake member annular in form, a braking surface of large area is provided within a housing of small volume for effectively engaging the helical spring in driving relation to the output hub. It should be understood, however, that only one of these braking members, that is, the flange of the collar or brake member, need be annular in form, the other being effective at points along the annulus. Moreover it is possible in such a form where one of these members is non-annular to provide an axial instead of a lateral pull on the member attached to end 28b of the spring 28 to thereby retard the rotational movement of that member to tighten the spring. In either case the compactness is retained but the increase braking effectiveness is reduced. In any event, there are no bulky or radially projecting parts. Consequently, the structure of the present invention can be made more compact than prior art structures.

FIGS. 5 through 8 illustrate an alternative form for the magnetically actuated spring clutch, where the clutch spring is of the unwrap type. In the sectional view of FIG. 5, the frame consists of a tubular housing, generally designated 60, and an end plate 62. As can be seen in FIGS. 5 and 8, the end plate 62 has attached to it, by spot welding or other suitable means, a mounting bracket 64 extending beyond the outer diameter of the tubular housing 60.

The driving member 70 of the clutch assembly is shown as a sprocket wheel 70a for a chain drive input and the driven member 72 is shown as a flanged hub sleeve which is adapted to feed power to a shaft, such as shaft 74. The driving member 70 and driven member 72 are rotatably supported along the shaft 74, having a common axis in relation to the frame 60. The driving member 70 is provided with a bearing sleeve 76 press fitted therein which allows the driving member to freely rotate relative to shaft 74. The driven member 72 and shaft 74 are held together by pin 77, so that when the driven member is rotated, the shaft is thereby rotated.

The driving member 70 is held in position axially along shaft 74 by its abutment against the driven member on one side and against annular adapter member 78, which is secured to the shaft 74 by set screw 80, on its other side.

The driven member 72 has a reduced diameter portion of substantially the same diameter as surface 76a of bearing sleeve 76, which rotates with the driving member. These surfaces 72a and 76a serve as clutch faces cooperating with closely wound helical clutch spring 84 of square cross-section, shown in FIG. 9. Clutch spring 84 fits snugly over clutch faces 72a and 76a. The end of the first turn of the spring 84 is bent into a tang 84a extending parallel to the axis of the turns of the spring and fits into hole 88 in driven member 72 as shown in FIGS. 5 and 7. The other end of spring 84 is bent into a tang 84b which extends radially outwardly and rides in slot 90 cut in a collar 92 which surrounds the helical spring shown in FIGS. 5 and 6. The collar 92 is coupled by two metal pins 96 and 97 of a uniform diameter to rotatable armature 94 providing a collar of magnetic material with a flat braking surface 94a. As shown in FIGS. 5 and 7, the pins are snugly received in holes along a diameter of the collar 92 at the same radius from the axis of rotation. Pins 96 and 97 extend through circumferentially extending slots 98 and 99, respectively, each of which extend over an arc of 90° in the driven member 72, through enlarged holes 100 and 101, respectively, in face plate 102, and snugly into circular holes 103 and 104, respectively, in the armature 94. The pins are centered through the holes 100 and 101 in the plate 102 and the plate is secured to driven member 72 by means of screws 105 and 106 which extend through circumferentially extending slots 107 and 108, respectively, in the plate 102 each of which slots extends over an arc of 90° into threaded holes in driven member 72. The plate 102 limits possible movement of the pins 96 and 97 and hence collar 92 relative to the driven member 72 of which plate 102 becomes a part when secured in place by the screws 105 and 106. The slots 98 and 99 provide a wide range of adjustment of the position of the driven member 72 with respect to the collar 92. This adjustment is needed since tolerances in the diameter of spring 84 may cause the angular position of the tangs of the springs attached respectively to collar 92 and driven member 72 to differ from one clutch to another, and the slots 98 and 99 accommodate these differences. At the same time the actual relative movement between collar 92 and driven member 72 required to actuate the clutch spring is quite small and the enlarged openings in the plate are sufficiently large to accommodate this but to prevent any over actuation which might damage the clutch. The plate then is put in place after the collar 92 and driven member 72 have been assembled with the clutch spring, and the slots 107 and 108 in the plate enable the holes 100 and 101 to be located wherever necessary to accommodate the pins. Thereafter, screws 105 and 106 are inserted through the slots 107 and 108 in the plate into the threaded holes in the driven member.

The rotatable armature 94 is composed of a magnetic material in order to provide an armature for a magnetic circuit, the operation of which is similar to the operation of the embodiment shown in FIG. 1. The flux for this magnetic circuit is provided by field winding 109 which is wound on bobbin 110 of nylon. The bobbin fits snugly over tubular member 111 of magnetic material and against end plate 62, also composed of magnetic material. Tubular member 111 is secured to end plate 62, as by spot welding. On the other side of nylon bobbin 110, an annular brake shoe 112 fits snugly over tubular member 111 and against the bobbin. The brake shoe 112 provides a braking surface 112a which projects slightly beyond tubular member 111 against which flat braking surface 94a of armature 94 is pulled for braking. The magnetic circuit is completed by tubular member 113 and end plate 62 both of magnetic materials which serve as part of the housing 60. Tubular member 113 fits snugly around annular brake shoe 112 and extends from braking surface 112a past the winding bobbin to end plate 62, where it is fixed to the end plate 62 by spot welding.

The shaft 74 rotates relative to the housing in bearing sleeve 114 which is force fitted within tubular member 111. In order to permit relative rotation between the armature 94 and the shaft 74, a bearing sleeve 115 is force fitted within the axial opening of the armature through which the shaft passes.

The clutch assembly is provided with means for preventing over-running of the driven member 72 and shaft 74. The driving member 70 is provided with a reduced diameter portion 70b on the opposite side of the sprocket wheel 70a from the clutch spring 84. The annular adapter member 78 is also provided with a reduced diameter portion 78a of substantially the same diameter as portion 70b of the driving member. The cylindrical surfaces of these reduced diameter portions 70b and 78a provide clutch faces which cooperate with a closely wound helical spring 120. Helical spring 120 fits snugly over the faces of both portions 70b and 78a. When the driven member 72 and shaft 74 tend to rotate faster than the driving member 70, the helical spring 120 will tend to be wound tightly down on the driving member and adapter member, thereby locking the driving member and adapter together, and hence locking the input and output of the assembly together to prevent over-running of the output in relation to the input.

In operation of the clutch assembly of FIG. 5, power is fed through the driving member by means of a chain or cable (not shown) driving the sprocket wheel 70a in a conventional manner. As the driving member 70 is rotated, rotation is imparted to clutch spring 84 which is wrapped down on the sleeve which rotates with the driving member. Since the spring is, in turn, fixed to the collar 92 and driven member 72, the collar and driven member rotate in synchronism with the spring 84 and driving member 70. The rotation of the driven member thereby drives shaft 74. Also, as the collar and driven member rotate, the rotatable armature 94 rotates therewith being driven by pins 96 and 97. However, when winding 109 is energized by a suitable D.C. source a magnetic field is created within the magnetic circuit defined by end plate 62, and members 111 and 113. The armature 94 provides the path of lowest reluctance across the air gap of that circuit and is drawn toward that gap sliding along shaft 74 in order to reduce to a minimum the total length of the air gap. By this arrangement, the armature is pulled laterally against braking surface 112a of brake shoe 112. Consequently, braking surface 112a resists rotation because of the frictional effect, thereby stopping the relative rotation of armature 94. The stopping of the rotation of the armature 94 stops the rotation of collar 92 by means of pins 96 and 97, thereby stopping driven member 72 and unwrapping clutch spring 84 from driving face 76a. Since the pins fit through enlarged holes in face plate 102, the face plate and the driven member 72 may move further around in their rotation relative to the armature member than the collar. By this arrangement, the spring, which is attached at its ends to the collar and driven member, unwinds slightly since the spring is wound in such a direction that a stopping of the collar relative to the driven member will cause an increase in spring diameter. Thus, the portion of the spring surrounding clutch face 76a of sleeve 76 in the driving member loosens from that face. Thereafter, driving member 70 and sleeve 76 rotate without driving the spring, the spring slipping around clutch face 76a as long as the winding is energized to produce the magnetic flux. When the winding is deenergized, the spring will wrap-down on clutch face 76a because of its inherent resilience, thereby again having the driving member in driving relation to the driven member.

It will be observed that in accordance with the present invention the improved means for engaging or disengaging the helical spring provides an assembly which is very simple in construction. It will be appreciated by those skilled in the art that the capabilities of the assemblies described fulfill the need for an economical and compact clutch assembly that is useful in a wide variety of applications.

Other modifications of the magnetic clutch and its assemblies described herein will occur to those skilled in the art. All such modifications are intended to be within the scope and spirit of the present invention as defined by the appended claims.

I claim:

1. A clutch assembly comprising: a frame; a driving member rotatably supported along an axis through said frame; a driven member rotatably supported along essentially the same axis of rotation as the driving member; a helical clutch spring fixed at one end to the driven member and tightly encircling the driving member; collar means engaging the free end of said clutch spring to rotate therewith when said spring is driven by said driving member, said collar means including a magnetic material and providing a braking surface; a brake member supported by said frame to provide a braking surface cooperable with said braking surface of said collar means, at least one of said cooperating braking surfaces being annular in form; means supported by said frame for providing a magnetic field to move said braking surface of said collar means against said braking surface of said brake member to stop rotation of said collar means and loosen said spring from said driving member; and coupling means for coupling said collar means to said driven member for stopping said driven member after said collar means is stopped but permitting relative movement between said collar means and said driven member to provide limited unwinding of said spring when the means for producing a magnetic field is energized.

2. The clutch assembly of claim 1 further comprising adjustable means for changing the coupling of said coupling means between said collar means and said driven member to allow for variations in the position of said collar means relative to said driven member due to relative variations in displacement of said ends of said spring held by said collar means and said driven member.

3. The clutch assembly of claim 1 in which the coupling means for coupling said collar means and driven member, providing rotatable members attached to said spring, comprises a stop member supported by one of said last-mentioned rotatable members and cooperating stop means supported by the other of said rotatable members for engaging said stop member after a predetermined movement of said other rotatable member to provide limited unwinding of said spring sufficient to permit said driving member to rotate relative to said spring.

4. The clutch assembly of claim 1 in which the coupling means comprises a stop member supported by the collar means and cooperating adjustable stop means supported by the driven member for engaging said stop member after a predetermined movement of said collar means to provide limited unwinding of said spring, said adjustable stop means being adjustable to change the position at which said stop means is engaged by said stop member.

5. A clutch assembly comprising: a frame; a driving member rotatably supported along an axis through said frame; a driven member rotatably supported along essentially the same axis of rotation as the driving member; a helical clutch spring fixed at one end to said driven member and tightly encircling said driving member; collar means engaging the free end of said clutch spring and rotatable therewith when said spring is driven by said driving member, said collar means including a magnetic material and providing a braking surface; a brake member supported by said frame and providing a braking surface cooperable with the braking surface of said collar means; at least one of said cooperating braking surfaces being annular in form; means supported by said frame for providing a magnetic field to move said braking surface of said collar means against said braking surface of said brake member to stop rotation of said collar means and loosen said spring from said driving member; and clutch means for providing a coupling between said driving member and said driven member for preventing over-running of said driven member relative to said driving member but permitting rotation of said driving member relative to said driven member.

6. The clutch assembly of claim 5 in which said clutch means comprises an adapter member coupled to said driven member to rotate therewith and having a clutch surface and a helical spring held at one end by said driving member and tightly encircling said clutch surface of said adapter member, said spring being wound in a direction so as to wrap tighter on said adapter member when said adapter member tends to rotate faster than said driving member.

7. A clutch assembly comprising: a frame; a driving member rotatably supported along an axis through said frame; a driven member rotatably supported along essentially the same axis of rotation as the driving member; a helical clutch spring fixed at one end to said driven member and tightly encircling said driving member; collar means engaging the free end of said clutch spring and rotatable therewith when said spring is driven by said driving member; brake means associated with said frame for stopping rotation of said collar means to loosen said spring from said driving member; means for actuating said brake means between a condition to stop said collar means and a condition free from engagement with said collar means; and coupling means for coupling said collar means to said driven member for stopping said driven member after said collar means is stopped but permitting limited relative movement between said collar means and said driven member to permit a predetermined amount of unwinding of said spring when said brake means is actuated to stop said collar means.

8. The clutch assembly of claim 7 further comprising adjustable means for changing the coupling of said coupling means between said collar means and said driven member to allow for variations in the position of said collar means relative to said driven member due to relative variations in displacement of said ends of said spring held by said collar means and said driven member.

9. The clutch assembly of claim 7 in which the coupling means for coupling said collar means and driven member, providing rotatable members attached to said spring, comprises a stop member supported by one of said last-mentioned rotatable members and cooperating stop means supported by the other of said rotatable members for engaging said stop member after a predetermined movement of said other rotatable member to provide limited unwiding of said spring sufficient to permit said driving member to rotate relative to said spring.

10. The clutch assembly of claim 7 in which the coupling means comprises a stop member supported by the collar means and cooperating adjustable stop means supported by the driven member for engaging said stop member after a predetermined movement of said collar means to provide limited unwinding of said spring, said adjustable stop means being adjustable to change the position at which said stop means is engaged by said stop member.

11. A clutch assembly comprising: a frame; a driving member rotatably supported along an axis through said frame; a driven member rotatably supported along essentially the same axis of rotation as the driving member; a helical clutch spring fixed at one end to said driven member and tightly encircling said driving member; collar means engaging the free end of said clutch spring and rotatable therewith when said spring is driven by said driving member; brake means associated with said frame for stopping rotation of said collar means to loosen said spring from said driving member; means for actuating said brake means between a condition to stop said collar means and a condition free of engagement with said collar means; and clutch means for providing a coupling between said driving member and said driven member for preventing over-running of said driven member relative to said driving member but permitting rotation of said driving member relative to said driven member.

12. The clutch assembly of claim 11 in which said clutch means comprises a clutch surface on said driven member to rotate therewith and a helical spring held at one end by said driving member and tightly encircling said clutch surface, said spring being wound in a direction so as to wrap tighter on said clutch surface when said driven member tends to rotate faster than said driving member.

References Cited
UNITED STATES PATENTS

| | | |
|---|---|---|
| 2,742,126 | 4/1956 | Morton. |
| 2,941,414 | 6/1960 | Lee. |
| 2,976,976 | 3/1961 | Parker _____ 192—84 |
| 3,185,276 | 5/1965 | Sajovec _____ 192—84 X |

DONLEY J. STOCKING, *Primary Examiner.*

ARTHUR T. McKEON, *Examiner.*